June 4, 1946.　　S. M. MacNEILLE ET AL　　2,401,697
RANGE FINDER
Filed March 13, 1943　　3 Sheets-Sheet 2

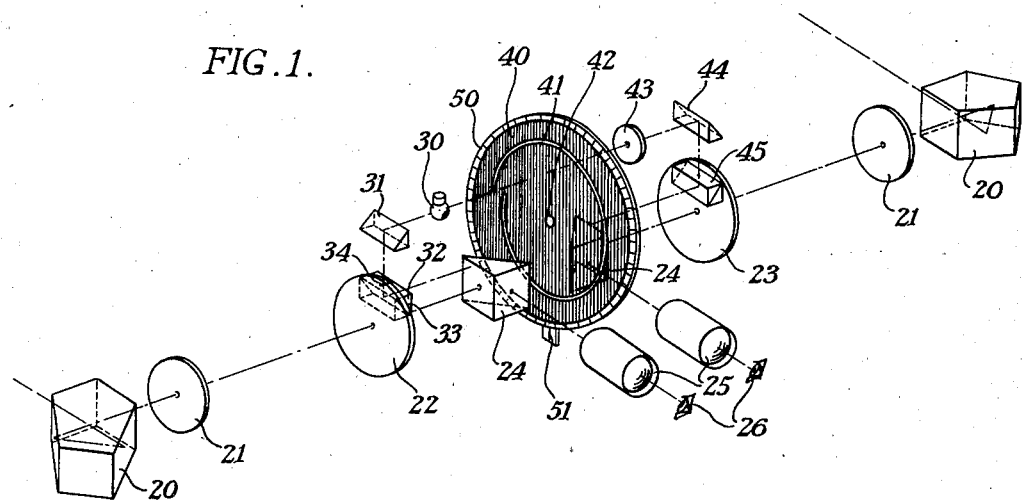
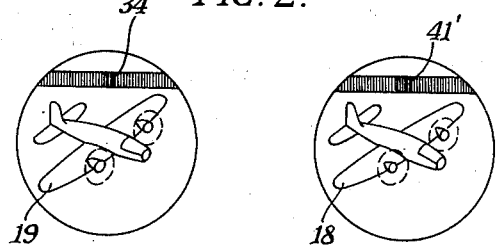
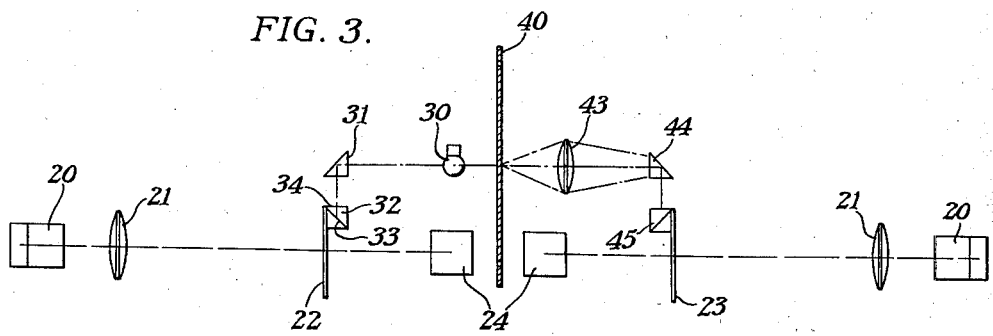

STEPHEN M. MacNEILLE
FREDERICK M. E. HOLMES
INVENTORS

BY *Newton M. Perriss*

ATT'Y

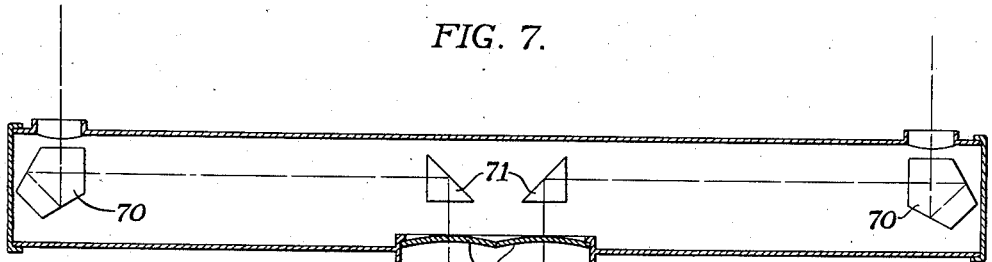
June 4, 1946.  S. M. MacNEILLE ET AL  2,401,697
RANGE FINDER
Filed March 13, 1943  3 Sheets-Sheet 3
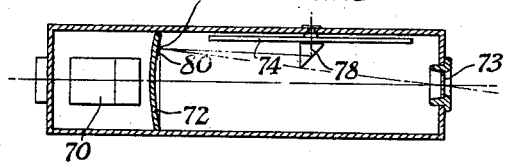
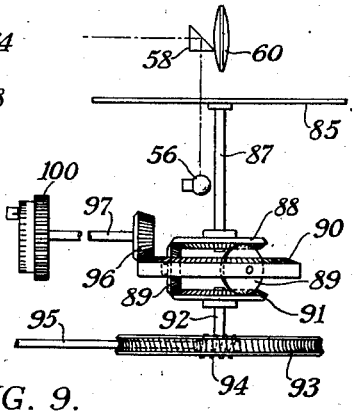
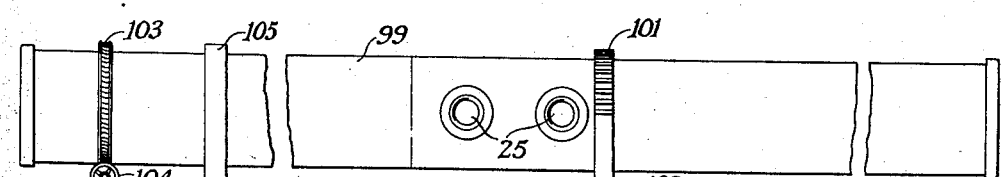
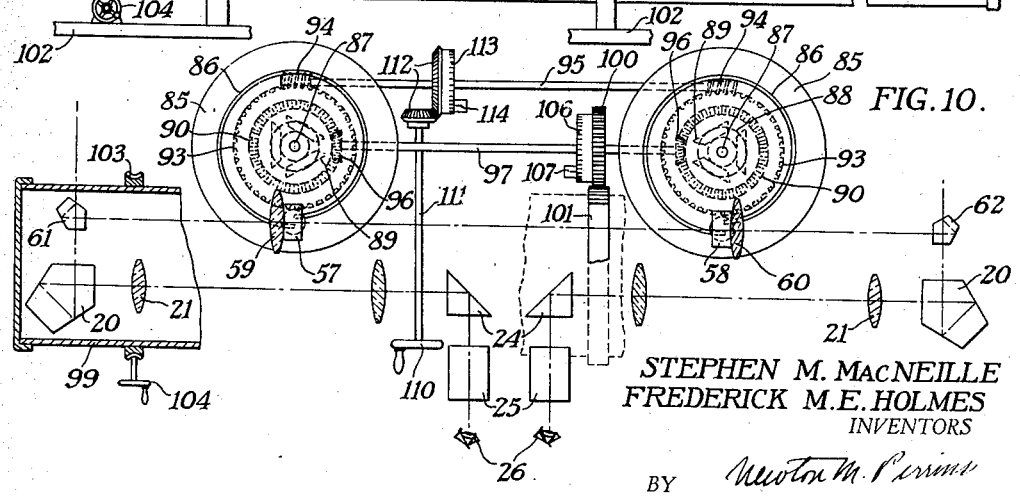
STEPHEN M. MacNEILLE
FREDERICK M.E. HOLMES
INVENTORS
BY Newton M. Perrine
ATT'Y Patented June 4, 1946

2,401,697

UNITED STATES PATENT OFFICE 2,401,697

RANGE FINDER

Stephen M. MacNeille and Frederick M. E. Holmes, Rochester, N. Y., assignors to Eastman Kodak Company, Rochester, N. Y., a corporation of New Jersey Application March 13, 1943, Serial No. 479,100

8 Claims. (Cl. 88—2.7)

This invention relates to range finders. This is Case J of a series of applications relating to this same subject, which series includes the following:

| Title | Serial No. | Filed | Inventors |
|---|---|---|---|
| Mount for optical element. | 461,584 | Oct. 10, 1942 | Mihalyi. |
| Range finder construction. | 461,585 | Oct. 10, 1942 | Do. |
| Range finders—Case A | 472,831 | Jan. 19, 1943 | Do. |
| Range finders—Case B | 472,832 | Jan. 19, 1943 | Do. |
| Range finders—Case C | 472,833 | Jan. 19, 1943 | Do. |
| Range finders—Case D | 472,834 | Jan. 19, 1943 | Mihalyi, MacNeille. |
| Range finders—Case E | 472,835 | Jan. 19, 1943 | Mihalyi, Tuttle. |
| Range finders—Case F | 479,096 | Mar. 13, 1943 | Mihalyi. |
| Range finders—Case G | 479,097 | Mar. 13, 1943 | Do. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case K | 479,101 | Mar. 13, 1943 | Do. |
| Range finders—Case L | 479,102 | Mar. 13, 1943 | Mihalyi. |
| Range finders—Case M | 491,954 | June 23, 1943 | MacNeille. |
| Range finders—Case N | 491,955 | June 23, 1943 | MacNeille, Mihalyi. |
| Range finders—Case O | 491,956 | June 23, 1943 | MacNeille. |
| Range finders—Case P | 505,016 | Oct. 5, 1943 | MacNeille, Mihalyi. |
| Range finders—Case T | 508,186 | Oct. 29, 1943 | MacNeille. |

Cases A to F and H and I of this series relate to autocollimating range finders including a range correction setting type and the principles thereof may be combined with the present invention. Similarly, the view finder system described in Case G may be combined with the present device. However, in its broadest form, the present invention is quite independent of these other inventions. It relates specifically to stereoscopic range finders and more particularly to those in which an apparent reticle mark distance is adjusted to match an apparent object distance.

It is the object of the present invention to provide a range finder of this class which is simple, relatively easy to make, accurate and reliable. It is an object of a preferred form of the invention to provide a bright reticle mark superimposed on the field of view.

In one preferred embodiment of the invention, both the right and left eye reticle marks are adjustable and the specific object is to permit the range finder to be used as a height finder.

In another specific embodiment of the invention, both reticle marks are primarily carried by a single member, the purpose being to provide improved stability of the instrument.

According to the invention, the above objects are attained by having a stereoscopic range finder in which the reticle marks either are in the comparison planes or are optically in said comparison planes and at least one of the marks is a portion of a spiral. That is, either the mark itself or a real or virtual image is in the corresponding comparison plane. The spiral is concentrically carried by a rotatable member, a disk if it is a flat spiral and a cylinder if it is a helical spiral. Rotation of the spiral changes the portion thereof which constitutes the reticle mark and causes the mark to move transversely. As is well known, shifting one reticle mark causes the apparent mark distance to change. In a preferred embodiment of the invention the portion of the spiral to constitute the mark is illuminated and an image thereof is projected in the corresponding comparison plane. The real image thus formed may be reflected to the eye of the observer by a mirror so that it appears to come from the comparison plane, which means that a virtual image is in the comparison plane. Preferably similar illuminating means are used to illuminate both of the reticle marks, since stereoscopic fusion requires the marks to be as nearly identical as possible.

To give the range directly, a scale and index may be operated by the rotatable member which carries the spiral. Furthermore, both marks may be curves carried by the rotatable member either two spirals or a spiral and a circle.

In a preferred embodiment of the invention, both marks are spirals carried by separate rotatable members and both of these are adjusted in accordance with the elevation angle view of the finder, specifically to introduce the sine of the angle automatically into the reading given by the scale which is operated by both spirals. Such an instrument automatically converts the range taken on the line of sight, to the height of the object being ranged.

In this embodiment or in any of the forms of the invention, the reticle marks may be located in front of the range finder base, between the viewing points, each mark being adjacent to and in the nodal plane of a lens. The two lenses are of the same power and are separated by their focal length so that each lens collimates the light from the mark associated with the other lens. This collimated light is picked up by small optical squares positioned respectively at each viewing point of the range finder and is directed into alignment with the light from the object being ranged so that it enters the range finder and is brought to focus to form the reticle mark images in the comparison planes.

The invention and its object will be fully understood from the following description when read in connection with the accompanying drawings, in which:

Fig. 1 is a perspective view of one embodiment of the invention;

Fig. 2 shows the field of view through the binocular eyepieces of the range finder shown in Fig. 1;

Fig. 3 is a front elevation of the arrangement shown in Fig. 1;

Fig. 7 is a plan view of an extremely simplified form of the invention;

Fig. 8 is a vertical section of the arrangement shown in Fig. 7;

Fig. 9 is a front outside view of the preferred embodiment of the invention useful for height finders;

Fig. 10 is a plan view of the optical system used in the instrument shown in Fig. 9;

Fig. 11 is an enlarged elevation of one detail of Fig. 10.

Figure 4:
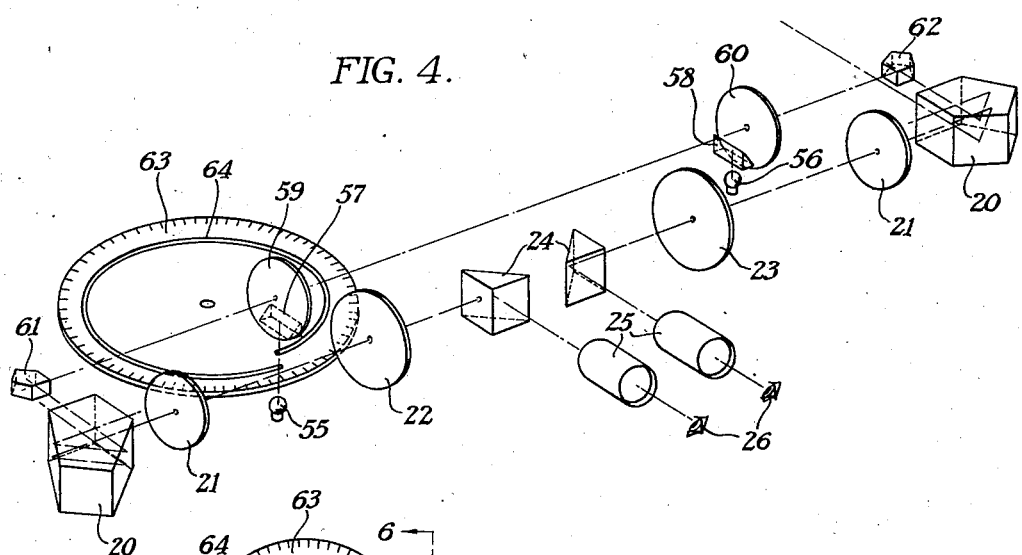
Fig. 4 is a perspective view of a combination of the present invention with the mutual nodal focal plane system of projecting reticle marks.

In Figs. 1 and 3 light from the object being ranged is received at the viewing points of a stereoscopic range finder and is directed by pentaprisms 20 and objectives 21 into focus in the left and right comparison planes 22 and 23 respectively, which may be viewed through prisms 24 and eyepieces 25 by the left and right eyes 26 of an observer. The observer sees the fields shown in Fig. 2. The images 18 and 19 thus formed are viewed stereoscopically to give an apparent object distance which may be compared with an apparent mark distance, the marks being bright images 34' and 41' produced as follows. Light from a lamp 30 is reflected by a prism 31 past a transparent mark 34 and is again reflected by a prism 32 toward the prism 24. The prism 32 is so located that a virtual image 34' of the mark 34 is in the comparison plane 22. The reflecting surface 33 of the prism 32 may be semi-transparent or may be opaque. The observer sees a bright reticle mark 34' by this arrangement. Similarly, light from the lamp 30 also passes through a portion of a spiral 41 carried by a disk 40 mounted to rotate about the center 42 of the spiral. Light through this portion of the spiral is brought to focus by a lens 43 and prism 44 to give an image on the upper surface of a prism 45 which in turn gives a virtual image of this real image, in the comparison plane 23. This results in a bright reticle mark 41' as shown in Fig. 2.

The bright marks 34' and 41' give an apparent mark distance which may be adjusted by moving the image 41' laterally. This is accomplished by rotating the disk 40 so that a different portion of the spiral 41 constitutes the reticle mark. When the apparent mark distance is the same as the apparent object distance, the range may be read from the setting of the disk 40 as indicated by a scale 50 and index 51.

Figure 5:
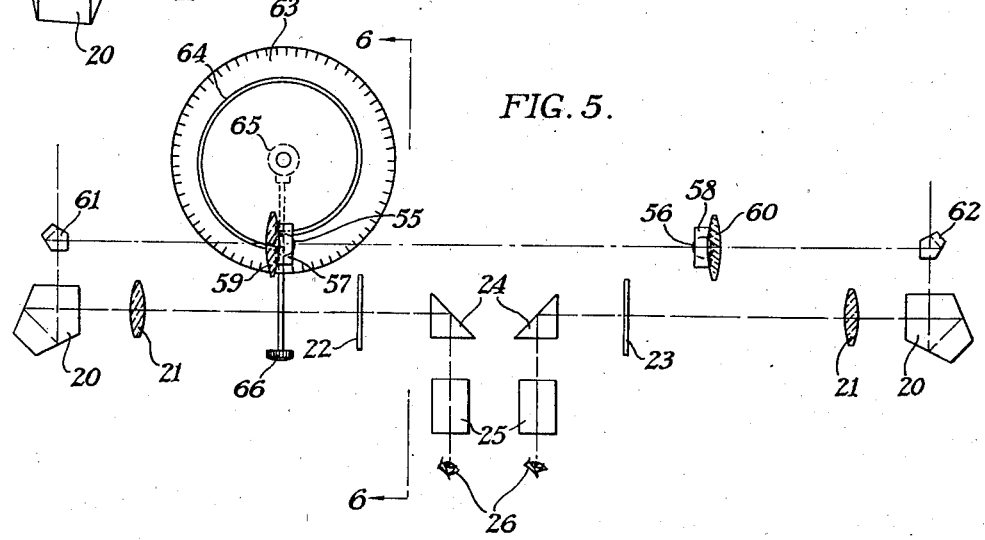
Fig. 5 is a plan view and Fig. 6 is a portion in elevation of the arrangement shown in Fig. 4.
Figure 6:
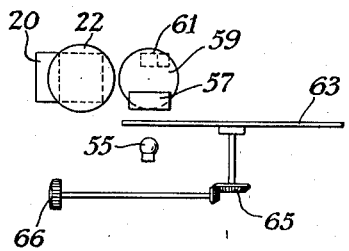

In Figs. 4, 5 and 6 the main difference from the arrangement shown in Fig. 1 is the fact that real images of both reticle marks are projected in the comparison planes 22 and 23. Light from a lamp 55 passes through a reticle mark 64 in the form of a spiral carried by a disk 63 and is reflected by a prism 57 through a lens 60 which collimates it. This collimated beam is picked up by a small pentaprism 62 and is brought to focus by the objective 21 in the comparison plane 23. Similarly, light from a lamp 56 passes through a fixed reticle mark not shown and is reflected by a prism 58 through a lens 59 which collimates the light, which in turn is picked up by a small pentaprism 61 and then is brought to focus by the objective 21 in the comparison plane 22. The lenses 59 and 60 are of the same focal length and the reticle marks are positioned at least optically in the nodal planes of each lens and the focal plane of the other lens. As in Fig. 1 the range is indicated by a scale carried by the disk 63.

In Fig. 7 light from an object being ranged is received by pentaprisms 70 and is reflected by prisms 71 through windows 72 to right and left eye sights 73. Although the windows 72 are curved, they have no focusing power. A disk 74 which is opaque except for a transparent circle 75 and a transparent spiral 76 is located just under the roof of the instrument so that a portion of the circle and a portion of the spiral are illuminated by skylights or small windows. This light is reflected by small prisms 78 under the spiral and circle respectively. The upper portion of the curved window 72 is coated to be either semi- or fully reflecting so that it receives light from the prisms 78 and sends a collimated beam to the eye windows 73. The left eye sees an image of a portion of the circle 75 and the right eye sees an image of a portion of the spiral 76, which images constitute marks having an apparent mark distance. This apparent marked distance may be adjusted by rotating the disk 74 so that the selected portion of the spiral 76 moves sideways. The range may be read by a scale and index operated by the disk 74. Since, due to the curved reflectors 72, the spiral images are at infinity this simple instrument is theoretically correct for all interocular separations.

In Figs. 9, 10 and 11 the instrument differs from that shown in Fig. 4 by having both reticle marks adjustable to permit the instrument to be used as a height finder. The disks 85 carry similar spirals 86 whose pitch involves a sine function to fit a trigonometrical equation discussed below. These disks are carried on shafts 87 which are rotated by bevel gear 88 as best seen (expanded for clarity) in Fig. 11 which is driven differentially. Three bevel gears 89 are carried by a floating ring 90 having a bevel thereon driven by a gear 96 on the end of a shaft 97. The floating gears 89 are driven by a lower bevel gear 91 on a shaft 92 which is in turn rotated by a worm gear 93 and a worm 94 on a shaft 95. Thus the disks 85 are driven either by the rotation of the shaft 95 or the rotation of the shaft 97. The shaft 97 carries a gear 100 which engages a fixed gear 101 mounted on the support 102 of the instrument as in Fig. 9. Only one quadrant of the gear 101 is used since the total change of angle of elevation is only between the horizontal and the vertical. This rotation is obtained by a gear 103 on the housing 99 of the instrument which gear is driven by a worm and elevation knob 104. The housing 99 is mounted in bearings such as 105 as well as in a bearing in the fixed gear 101. Thus, as the elevation angle of the housing 99 is changed relative to the support 102, the gear 100 rolls on the fixed gear 101 and thus rotates the ring gears 90 and in turn the disks 85.

The other part of the differential drive is obtained by rotating a range knob 110 which, through bevel gears 112, rotates the shaft 95 and hence rotates the worm gears 93 and through the differential systems, the disks 85. The angle of elevation may be read directly by a scale 106 also mounted on the shaft 97 against an index 107. The height may be read by a scale 113 carried by the shaft 95, against an index 114.

Due to the shape of the spirals 86, the lateral displacement of the reticle marks is proportional to the sine of the angle of rotation of the disks 85. This angle of rotation is in one case proportional to the sum of the angle of elevation and the angle of rotation of the shaft 95 and in the other case to the difference of these two angles. Since trigonometrically the sin $(X+Y)+\sin(X-Y)=2 \sin X \cos Y$, the instrument can be calibrated to give the height directly, by having the marks of the scale 113 distributed according to the cosine of the angle of rotation of the shaft 95. Of course, if one is interested in the slant range rather than the height of the object being ranged, one merely disconnects the gear 100 from the shaft 97 and rotates the shaft 97 until the scale 106 reads 90°. Obviously, an object directly overhead has the same height and slant range. Thus, whenever the scale 106 reads 90°, the scale 113 reads slant range directly.

It will be noted that rotation of the shaft 95 turns the disks 85 in the same direction (which causes the recticles to move effectively in opposite directions and hence to give different apparent reticle distances) whereas the shaft 97 rotates the disks 85 in opposite directions as required by the equation given above.

Obviously, a similar gearing, 90° out of phase, gives horizontal range rather than height, by involving the cosine instead of the sine of the elevation angle.

Having thus described the preferred embodiments of our invention, we wish to point out that it is not limited to these structures but is of the scope of the appended claims.

What we claim and desire to secure by Letters Patent of the United States is:

1. A stereoscopic range finder of the type having two comparison planes in which images of the object being ranged are formed to be viewed stereoscopically to give an apparent object distance and being characterized by reticle marks at least optically in said comparison planes to given an apparent mark distance, at least one of the marks being a portion of a spiral, and a rotatable member concentrically carrying said spiral whereby rotation of said member changes the portion which constitutes said one of the marks and thus adjusts said apparent mark distances.

2. A range finder according to claim 1 including means for illuminating said portion of the spiral and the other mark.

3. A range finder according to claim 1 in which an optical system including an objective lens projects an image of said portion in the corresponding comparison plane.

4. A range finder according to claim 1 in which each reticle mark is adjacent to and at least optically in the nodal plane of a lens and the two lenses are of the same power and separated by their focal length so that each mark is at least optically in the focal plane of the lens corresponding to the other mark and in which optical squares are positioned respectively at each viewing point of the range finder to receive light from the marks through the lenses and to direct this light into alignment with the light from the object being ranged and hence into focus in the comparison planes.

5. A range finder according to claim 1 in which both marks are portions of spirals and means are included for adjusting both spirals for ranging and also in accordance with the elevation angle of view of the finder.

6. A range finder according to claim 1 including a scale and index operated by said rotatable member.

7. A range finder according to claim 1 in which both marks are portions of curves carried by said rotatable member.

8. A range finder according to claim 1 in which both marks are portions of spirals having their pitch inversely proportional to the sine of angle of rotation, means are included for adjusting both spirals in proportion to the angle of elevation of the finder and means are included for rotating the spirals effectively in opposite directions and for operating a scale and index.

STEPHEN M. MacNEILLE.
FREDERICK M. E. HOLMES.